United States Patent [19]

Jeffery et al.

[11] Patent Number: 5,402,845
[45] Date of Patent: Apr. 4, 1995

[54] RECOVERY PROCESS FOR HEAT PUMP SYSTEM

[75] Inventors: Harold L. Jeffery, Ft. Wayne, Ind.; Harrison T. Hickenlooper, III, Palatka, Fla.

[73] Assignee: Carrier Corporation, Syracuse, N.Y.

[21] Appl. No.: 206,785

[22] Filed: Mar. 4, 1994

[51] Int. Cl.[6] .............................................. F25B 29/00
[52] U.S. Cl. ........................................ 165/12; 165/29; 236/49.3
[58] Field of Search ................. 165/29, 12; 236/46 R, 236/49.3; 62/231

[56] References Cited

U.S. PATENT DOCUMENTS

| 4,442,972 | 4/1984 | Sahay et al. | 236/46 R X |
| 4,716,957 | 1/1988 | Thompson et al. | 236/49.3 X |
| 5,181,653 | 1/1993 | Foster et al. | 236/49.3 |
| 5,344,069 | 9/1994 | Narikiyo | 165/22 X |

Primary Examiner—William E. Wayner

[57] ABSTRACT

A process for noting in advance when a change in set point temperature is to occur in one or more zones. A heating stage is prematurely activated and dampers are selectively opened in the one or more zones that are about to experience changes in set point temperature. Activation of a second stage of heating is not permitted unless the zone temperature is lagging the current set point.

11 Claims, 5 Drawing Sheets

RECOVERY PROCESS FOR HEAT PUMP SYSTEM

BACKGROUND OF THE INVENTION

This invention relates to the control of a heat pump system having one or more zones that may be requiring different amounts of conditioned air at any point in time. In particular this invention relates to the control of the heat pump system when at least one zone is to respond to a significant change in the temperature set point for that zone.

Multiple zoned heating systems will typically have individually programmed set point temperatures covering a day or a week at a time. These zoned heating systems will often undergo a significant change in set point temperature when for instance one or more zones switch from a night time setback temperature to a day time temperature. In such situations, a tremendous demand is sometimes placed on the heating system to provide the heated air to these zones.

The ability of a heat pump system to quickly respond to such a heat demand may be less than adequate. In this regard the one or more zones may each be requiring a significant change in temperature that cannot be achieved quickly by the heat pump itself. Heat pump systems often have an auxiliary stage of heating to supplement the heat being provided by the heat pump in such circumstances. These auxiliary stages are typically electrical resistance heating devices that consume considerable power when in use. This electrical power consumption tends to offset the economical savings of the heat pump itself.

OBJECTS OF THE INVENTION

It is an object of the invention to provide a heat pump system with an ability to respond to a change in set point temperature in an economical and efficient manner.

SUMMARY OF THE INVENTION

The above and other objects are achieved by providing a heat pump system with a programmed control that initiates recovery from the current temperature before a scheduled change in set point temperature is to occur. The programmed control includes a monitoring of each zone to be heated or cooled by the heat pump system so as to note in advance a scheduled change in set point temperature in any zone. An electronically controlled damper is opened for any zone which is to experience the scheduled change in set point temperature within a predetermined period of time. The heat pump is activated sufficiently prior to the scheduled change time so as to cause the zone to at least partially recover from the previous set point temperature. In the preferred embodiment an auxiliary heating stage is not activated for recovery purposes until the scheduled change time. This minimizes the use of the more costly auxiliary heating stage during temperature recovery for the one or more zones.

BRIEF DESCRIPTION OF THE DRAWINGS

Other objects and advantages of the present invention will be apparent from the following description in conjunction with the accompanying drawings in which.

DESCRIPTION OF THE PREFERRED EMBODIMENT

Figure 1:
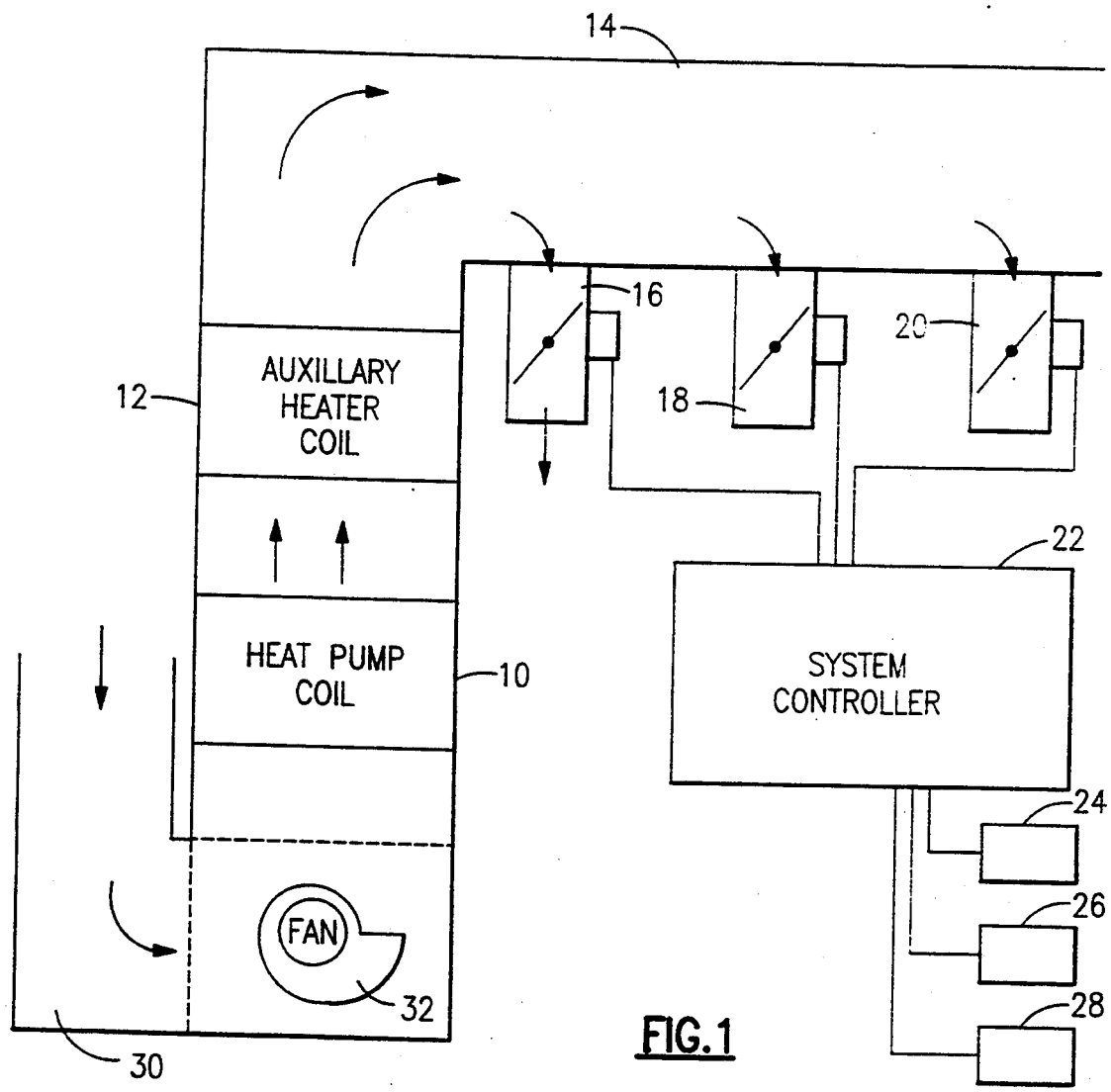
FIG. 1 is an overall diagram of a heat pump system having an auxiliary stage of heating and a plurality of separate temperature zones controlled by an overall control system.

Referring to FIG. 1, a two stage heating system including a heat pump coil 10 and an auxiliary heater coil 12 provide conditioned air via a duct 14 to a number of temperature controlled zones via controlled dampers 16, 18, and 20. These dampers are controlled by a system controller 22 which receives the temperature readings from each zone via remote temperature sensors 24, 26, and 28. The air in the respective zones is returned to the heat pump coil 10 via an air return duct 30 having a fan 32 located therein.

Figure 2:
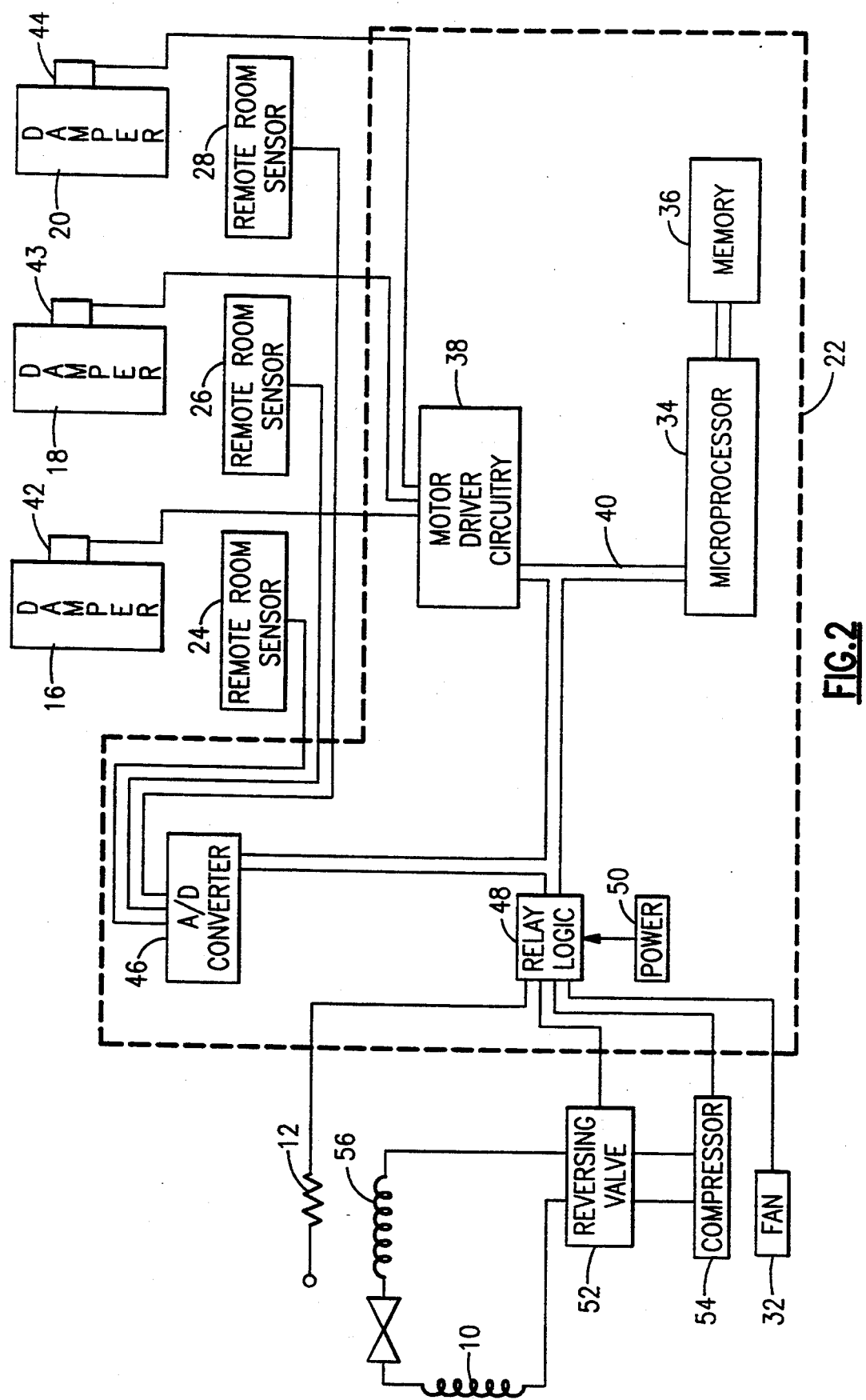
FIG. 2 is a diagram of the overall control system including a microprocessor which executes a process allowing the heat pump system to efficiently provide heat during a heat recovery period for one or more zones.

Referring now to FIG. 2, various elements of the heat pump system are further illustrated relative to control elements of the system controller 22. These control elements include a microprocessor 34 interacting with a memory 36 associated therewith. The microprocessor 34 communicates with motor driver circuitry 38 via a communications bus 40. The motor driver circuitry 38 interfaces with damper motors 42, 43, and 44 that position dampers within each electronically controlled damper configuration 16, 18, and 20. The microprocessor 34 also communicates with an A/D converter 46 which receives signals from the remote room sensors 24, 26, and 28. Communication is also established by the bus 40 with relay logic 48 which together with a power source 50 applies appropriate amounts of electrical current to the auxiliary heater coil 12 as well as a reversing valve 52 and a compressor 54 associated with the heat pump coil 10. It is to be appreciated that the compressor 54 is operative to compress refrigerant flowing in the heat pump loop comprising the heat pump coil 10 as well as a secondary coil 56. The direction of flow of the refrigerant depends on the orientation of the reversing valve 52 as defined by the relay logic 48 in response to appropriate signals from the microprocessor 34 via the bus 40.

Figure 3:
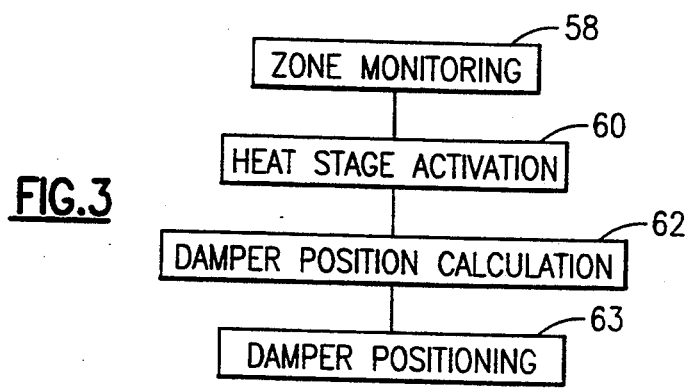
FIG. 3 illustrates the overall logic flow of the process executed by the microprocessor of FIG. 2 during recovery from current temperature conditions.

Referring now to FIG. 3, a process for controlling the system of FIGS. 1 and 2 is generally illustrated. It is to be appreciated that this process is normally stored in memory 36 for execution by the microprocessor 34. The process begins with a zone monitoring routine 58 which monitors each zone for any upcoming scheduled changes to the zone's set point temperature. A recovery flag is set for any zone that is to experience a change in set point temperature within a predefined period of time. The microprocessor proceeds to a heat stage activation routine 60 which activates the heat pump if any zone has had a recovery flag set by the zone monitoring program. The microprocessor thereafter proceeds to a damper position calculation routine 62 which calculates the position for each damper including any damper associated with a zone that has had a recovery flag set by the zone monitoring system. The microprocessor finally proceeds to a damper positioning routine 63 which causes the motors 42, 43 and 44 to move the dampers to any positions established by the damper position routine. As will be explained in detail hereinafter, the heat stage activation routine will also permit normal activation of both the heat pump and the auxiliary stage of heating when certain deviations occur from present set point temperatures in the zones. The damper positioning routine will define appropriate damper positions for any zones not experiencing a recovery. It is to be understood that the process of FIG. 3 is repeated periodically by the microprocessor 34 at sufficient intervals to assure that the zones are adequately monitored so as to provide appropriate adjustments to the heating stages and the electronically controlled damper positions.

Figure 4:
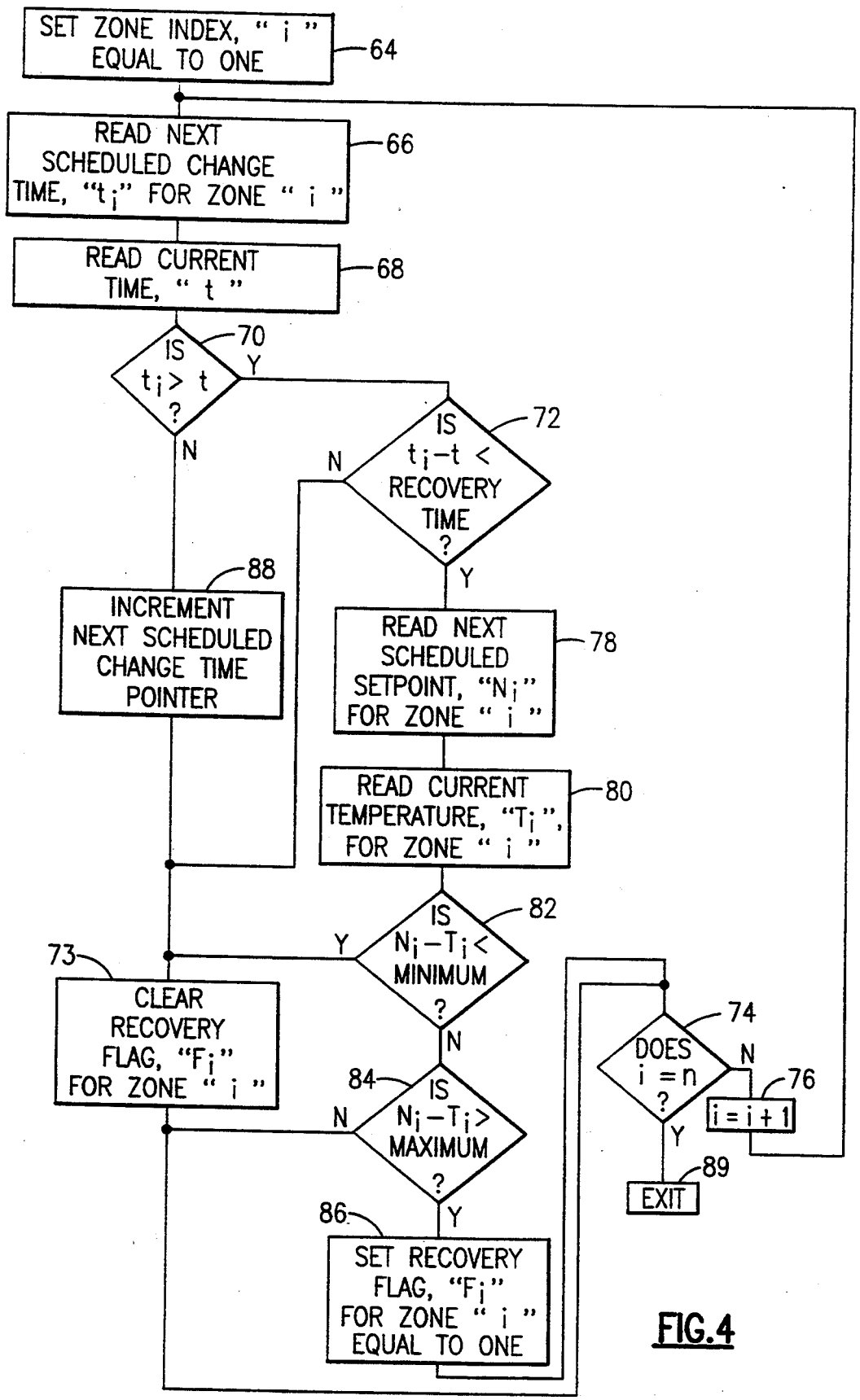
FIG. 4 illustrates the logic of a zone monitoring routine within the process of FIG. 3.

Referring now to FIG. 4, the zone monitoring routine begins with a step 64 wherein a zone index "i" is set equal to one. The zone index is used to uniquely identify each zone receiving conditioned air from a respective electronically controlled damper. A zone index of one may for instance identify the zone associated with damper 16. The microprocessor proceeds to a step 66 and reads the next scheduled change time "$t_1$" for the zone "i". This scheduled change time is preferably read from a stored table of scheduled times for changes to occur in set point temperature for the particular zone. A pointer may be used to point to the next scheduled change time that is to be read in step 66 for the particular zone index value. The new or next set point temperature is preferably stored in association with the scheduled change time. The microprocessor proceeds to a step 68 and reads the current time "t" from a system clock which defines the current time on a 24 hour basis. The next scheduled change time "$t_i$" read in step 66 is compared with the currently read time of step 68 in a step 70. If the next scheduled change time is greater than the current time, the microprocessor will proceed to a step 72 and inquire as to whether the difference between the next scheduled change time for "$t_i$" and the currently read time "t" is less than a predefined recovery time. The predefined recovery time may be any time which would allow for at least partial recovery in the temperature of the zone that is to experience a change in set point temperature. In the event that the difference in the next scheduled change time minus current temperature is greater than the predefined recovery time, the microprocessor will proceed to a step 73 and clear the recover flag "$F_i$" for the particular zone. This microprocessor will proceed to a step 74 and inquire as to whether the zone index "i" is equal to "n". The value "n" is equal to the total number of heating zones for the system of FIG. 1. In the event that the zone index does not equal the numerical value "n", the microprocessor will proceed to a step 76 and increment the zone index. The next scheduled change time for the thus denoted zone will be read in step 66 and compared with the current time in step 70. If the scheduled change time is greater than the current time, the microprocessor will again proceed to a step 72 and inquire as to whether the difference between the next scheduled change time and the current time is less than the recovery time. In the event this difference for the particular zone "i" is less than the recovery time, the microprocessor will proceed to a step 78 and read the next scheduled set point temperature, "$N_i$" for zone "i". The microprocessor next proceeds to a step 80 and reads the current temperature "$T_i$" for zone "i". This will be a reading of the current temperature defined by the room sensor associated with the particular temperature controlled zone. It is to be appreciated that the value of the room sensor is queried and stored in memory 36 by the microprocessor 34.

The difference between the next set point temperature, "$N_i$" and the currently read temperature "$T_i$" is computed and compared with a minimum allowed difference in a step 82. This allowable minimum difference may be for instance one half degree. In the event that the allowable minimum has been exceeded, the microprocessor will proceed to a step 84 and inquire as to whether the computed difference "$N_i$" minus "$T_i$" is greater than an allowed maximum difference. The allowed maximum difference may be set at a value of one and one half degrees. In the event that the computed difference is more than the maximum allowable amount, the microprocessor will proceed to a step 86 and set a recovery flag "$F_i$" for the particular zone. The microprocessor will thereafter return to step 74 and inquire as to whether the zone index "i" is equal to "n". As long as the index has not yet reached "n", the microprocessor will proceed to increment the index in step 76 and read the next scheduled change time for the thus identified zone. If the next scheduled change time for the zone is within the recovery time of step 72, the next scheduled set point "$N_i$" and the temperature "$T_i$" for the zone will be read in steps 78 and 80. If the difference between the next scheduled set point and the current temperature for the zone is less than the allowed minimum in step 82, the microprocessor will proceed to a step 73 and clear the recovery flag "$F_i$" for the particular zone. It is hence to be appreciated that a recovery flag previously set for a particular zone will be cleared in step 73 when the next scheduled set point is within the allowed minimum variation from the current temperature of the zone. Following the clearing of the recovery flag "$F_i$" for zone "i" the microprocessor will proceed back to step 74 and again inquire as to whether the zone index "i" is equal to "n". If the zone index still does not equal "n", the microprocessor will proceed to once again increment the index in step 76 and read the next scheduled change time for the thus identified zone. If the next scheduled change that is currently pointed to for this zone has been exceeded, the microprocessor will proceed along a no path to a step 88 and increment the pointer for the zone so as to point to the next succeeding time in which the set point is to be changed for the zone. When the zone index has reached the last zone to be monitored, the microprocessor will proceed from step 74 to an exit step 89 and exit to the heat stage activation routine 60.

Figure 5:
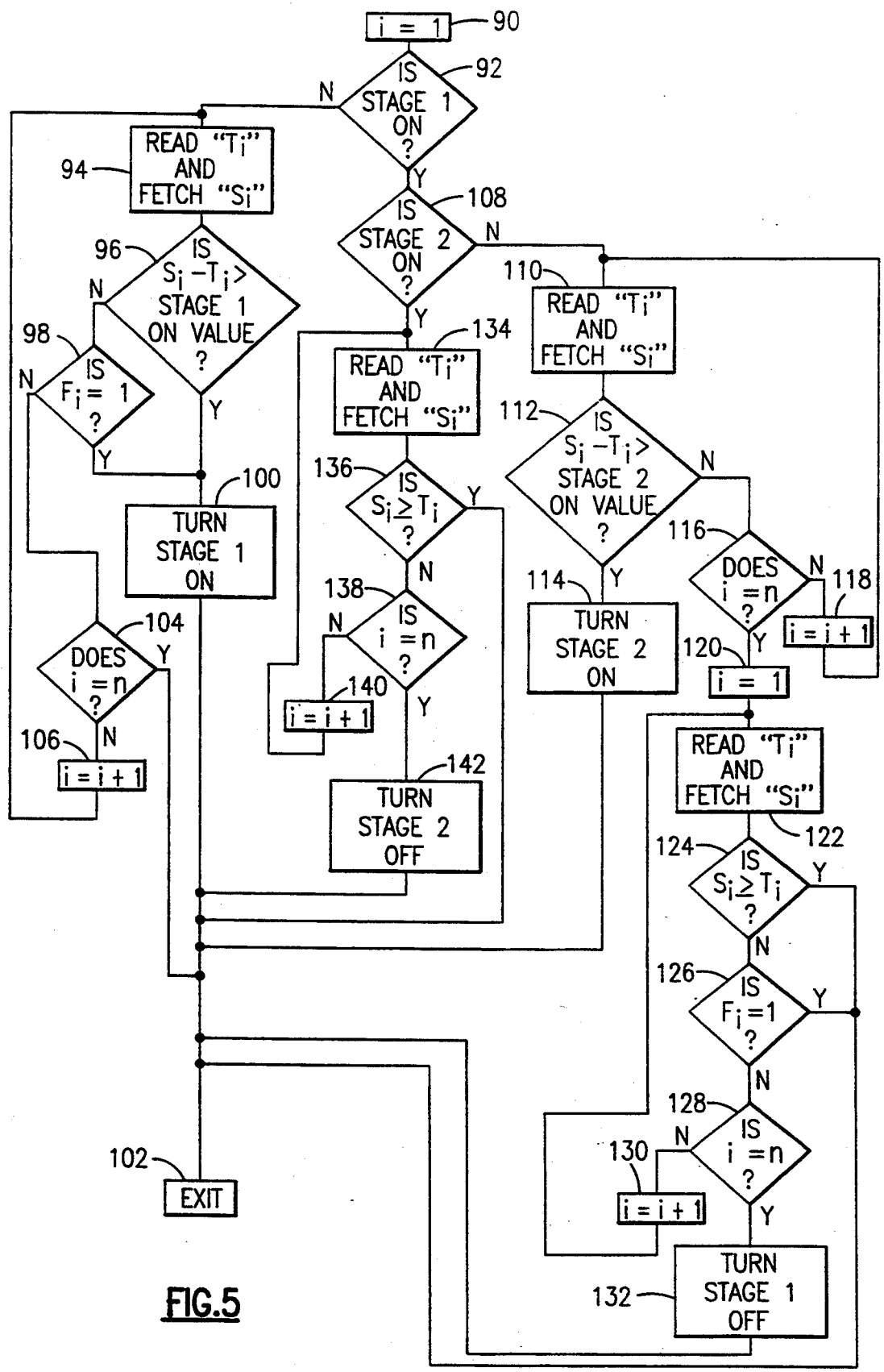
FIG. 5 illustrates the logic of a heat stage activation routine within the process of FIG. 3.

Referring now to FIG. 5, the heat stage activation routine is illustrated in detail. This routine begins with a setting of the zone index "i" equal to one in a step 90. Inquiry is next made as to whether the stage one heating is on in a step 92. Stage one heating is the heat pump comprising the heat pump coil 10, reversing valve 52, compressor 54 and secondary coil 56 of FIG. 2. The inquiry of step 92 addresses whether the reversing valve is set for heating the refrigerant flowing through the coil 10 and whether or not the compressor 54 has been activated. In the event that the aforementioned conditions are not met, the microprocessor will proceed along the no path out of step 92 and read the current temperature "$T_i$" for the zone "i" and fetch the current set point "$S_i$" for zone "i". The current set point for a particular zone is preferably obtained from the table of change times and associated set point values that was used in step 78 to identify the next scheduled set point. It is to be noted that this table of change times and associated set point values will preferably be in chronological order so that the current set point can be easily located relative to the next scheduled set point. It is also to be noted that this table can be changed at any time so as to reflect a possible override of a previously tabulated change time and set point. Referring now to step 96, an inquiry is made as to whether the difference between "$S_i$" and "$T_i$" is greater than a threshold on value for stage one. The on value for this stage may be a predefined temperature difference of one and one-half that must be present to normally activate this stage. In the event that this threshold value has not been exceeded, the microprocessor will proceed out of step 96 to a step 98 and inquire as to whether the recovery flag "$F_i$" for zone "i" is equal to one. In the event that the recovery flag has been set, the microprocessor will proceed to step 100 and turn stage one on. This would be accomplished by setting the reversing valve 52 for heating and activating the compressor 54 in FIG. 2. Referring again to step 96, in the event that the differential between set point and current temperature reading is greater than the threshold value for stage one, the microprocessor will proceed directly to step 100 and turn stage one heating on. In this regard, it is to be appreciated that stage one heating will be turned on either if the threshold value for the stage one heating has been exceeded by the current temperature conditions or if the recovery flag has been set for the particular heating zone being investigated. Following the activation of stage one, the microprocessor will proceed from step 100 to an exit step 102 for the heating stage activation routine. Referring again to step 98 in the event that the recovery flag for the particular zone has not been set, the microprocessor will proceed to a step 104 and inquire as to whether the zone index is equal to "n". If the final zone has been reached, the microprocessor will proceed along the yes path to exit step 102. If another zone is to be examined, the microprocessor will increment the zone index in a step 106 and return to step 94 to read the current temperature and set point for the thus identified zone.

Referring again to the beginning portion of the heating stage activation routine and in particular to the inquiry of step 92 as to whether a stage one of heating is on. In the event that the stage one of heating is on, the microprocessor will proceed to a step 108 and inquire as to whether the stage two of heating is also on. Stage two of heating is the auxiliary heater of FIGS. 1 and 2. In the event that stage two has not yet been activated, the microprocessor will proceed along the no path to a step 110 and read the current temperature "$T_i$" and the set point "$S_i$" for the particular indexed zone. The difference between these values is calculated and inquiry is made as to whether the calculated difference is greater than the stage two on value in a step 112. This value may for instance be a threshold of two degrees. In the event that the stage two threshold value has been exceeded, the microprocessor will proceed to a step 114 and turn the stage two of heating on. This is accomplished by sending a signal to relay logic 48 to apply power to the auxiliary heater coil 12. The microprocessor will next proceed to step 102 and exit the heat stage activation routine. Referring again to step 112, in the event that the computed difference of set point minus current temperature is not greater than the on value for stage two, the microprocessor will proceed along a no path to a step 116 and inquire as to whether the zone index equals "n". In the event that another zone remains to be examined, the microprocessor will increment the zone index in a step 118 and return to step 110 to read the current temperature and set point for the thus identified zone.

It is to be appreciated that if none of the zones have a computed difference between set point and current temperature that exceeds the on value for stage two, the microprocessor will eventually proceed out of step 116 along the yes path to a step 120 and again set the zone index equal to one. The current temperature "$T_i$" is read from the sensor for this zone and the set point temperature is fetched from the table of set point values for this zone in a step 122. Inquiry is next made in a step 124 as to whether the thus fetched set point temperature is equal to or greater than the read current temperature. In the event that the set point equals or exceeds current temperature, the microprocessor will proceed to exit the heat stage activation routine in step 102. Referring again to step 124, in the event that set point is less than current temperature, the microprocessor will proceed to a step 126 and inquire as to whether the recovery flag "$F_i$" for the particular zone is equal to one. If the recovery flag is equal to one, the microprocessor will proceed to exit in step 102. The microprocessor will otherwise proceed from step 126 and inquire in a step 128 as to whether the zone index equals "n". As long as the zone index does not equal "n", the microprocessor will increment the index in a step 130 and return to step 122 for a reading of the current temperature for the thus identified zone and a fetching of the set point for this zone.

It is to be appreciated that if all zones have a set point less than current temperature, and if none of the zones have a recovery flag set equal to one, then the microprocessor will eventually exit from step 128 to a step 132 and turn off the stage one of heating. This is essentially accomplished by providing a signal to relay logic 48 which in turn provides an appropriate signal level turning off the compressor 54. Following the turning off of stage one of heating, the microprocessor will proceed to exit in step 102 from the heating stage activation routine.

Referring again to the beginning of the heating stage activation routine in FIG. 5, in the event that both stage one and stage two are on, the microprocessor will proceed from a step 108 to a step 134 and read the current temperature "$T_i$" and thereafter fetch the set point temperature for the zone. Inquiry is next made in a step 136 as to whether set point is equal to or greater than current temperature. If set point is equal to or greater than current temperature, the microprocessor will proceed to exit in step 102. On the other hand, if set point is equal to or greater than the current temperature, the microprocessor will proceed along the yes path to a step 138 and inquire as to whether the zone index "i" is equal to "n". In the event that the zone index is not yet equal to "n", the microprocessor will proceed to increment the zone index in step 140 before again reading the current temperature and set point values for the thus indicated zone. Referring again to steps 136 and 138, if all zones indicate that the set point is greater than current temperature, than, the microprocessor will proceed to exit from step 138 to a step 142 and turn off the stage two of heating. This is accomplished by sending a signal to the relay logic 48 causing the power to no longer be applied to the resistance coil 12 associated with the auxiliary heater. The microprocessor will proceed to exit in step 102 from the heating stage activation routine.

Figure 6:
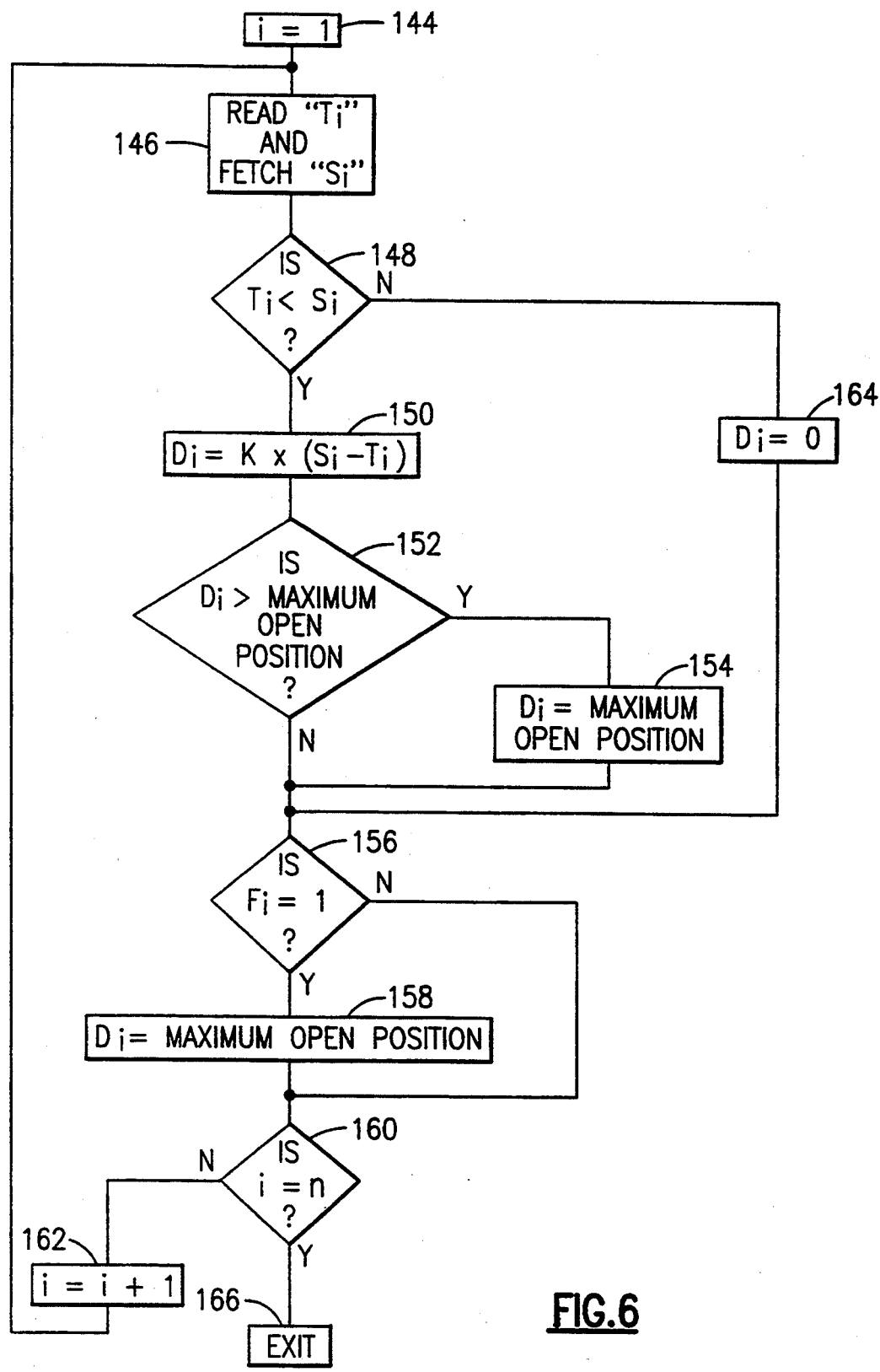
FIG. 6 illustrates the logic of a damper position routine within the process of FIG. 3.

Referring to FIG. 6, the damper position calculation routine is illustrated in detail. It will be remembered that the damper position calculation routine is entered each time the microprocessor exits from the heat stage activation routine of FIG. 5. The damper position routine begins by setting the zone index "i" equal to one in a step 144. The microprocessor proceeds to read the current temperature for the particular zone in step 146 and fetches the set point temperature for this zone. Inquiry is next made in step 148 as to whether the current temperature for this zone is less than the set point temperature for this zone. In the event that the current temperature is less than set point, the microprocessor will proceed to a step 150 and calculate a damper position for the electronically controlled damper associated with the particular zone. Referring to the damper position calculation of step 150, it is to be noted that this position is calculated by multiplying a constant "K" times the difference between the set point temperature "$S_i$" and the current temperature "$T_i$" for the zone. The constant "K" defines the whole or fractional number of increments in damper position per degree of temperature difference. It is to be appreciated that this constant will depend on the particular damper and how responsive the damper is to be to a temperature difference. Following the calculation of damper position in step 150, the microprocessor proceeds to a step 152 and inquires as to whether the calculated damper position is greater than a maximum open position. In the event that the calculated damper position of step 150 is greater than the maximum allowable, the microprocessor will proceed to a step 154 and merely set the value of the calculated damper position equal to the maximum allowable. The microprocessor will proceed out of either step 152 or step 154 to inquire in a step 156 as to whether the recovery flag, "$F_i$" is equal to one for the particular zone. If the recovery flag has been set equal to one, the microprocessor will proceed to a step 158 and set the damper position "$D_i$" equal to the maximum allowable open position. This effectively sets the damper at its maximum open position even if the calculated position of step 150 is less than the maximum open position.

Referring again to step 156, in the event that the recovery flag has not been set, the microprocessor will proceed to a step 160 without further adjustment to the damper position. The microprocessor will next inquire in a step 160 as to whether the zone index is equal to "n". In the event that the zone index is not, the microprocessor will proceed to increment the zone index in step 162 and return to step 146 to read the current temperature and fetch the set point temperature for the thus identified zone. This current temperature will be compared with the set point temperature in a step 148. In the event that the current temperature is greater than set point, the microprocessor will proceed to a step 160 and set the damper position for this particular zone equal to zero. The microprocessor will proceed to step 156 and again inquire as to whether the recovery flag for the thus identified zone is equal to one. Depending on whether the recovery flag has been set, the microprocessor will either set the damper position to the maximum open position or allow the damper position to remain as calculated in step 160 for the particular zone. In either case, the microprocessor will proceed to step 160 and inquire as to whether the zone is equal to "n". When damper positions have been calculated for all zones, the microprocessor will proceed from step 160 to a step 166 and exit from the damper activation routine. The microprocessor will proceed to the damper positioning routine 63 of FIG. 3 which moves the damper as necessary to the position established by the position calculation routine of FIG. 5.

It is to be appreciated that the damper positioning routine 63 will have set any electronically controlled damper associated with a zone that is to experience a recovery long before the set point for the zone actually changes to the next scheduled set point. This is accomplished by having set the recovery flag for that particular zone in the zone monitoring routine of FIG. 4 and noting the set value in step 156 of the damper activation routine. It is furthermore to be appreciated that the recovery flag setting in the zone monitoring routine will have caused the stage one heating to be turned on for any zone having a recovery flag setting. The stage two heating will not however be turned on by virtue of any recovery flag setting. In this regard, stage two is only turned on in the heating stage activation routine in the event that the current set point has deviated sufficiently from the current temperature reading so as to justify activation of stage two.

It is to be appreciated that a particular embodiment of the invention has been described. Alterations, modifications, and improvements thereto will readily occur to those skilled in the art. Such alterations, modifications, and improvements are intended to be part of this disclosure even though not expressly stated herein and are intended to be within the scope of the invention. Accordingly the foregoing description is by way of example only and the invention is to be limited only by the following claims and equivalents thereto.

What is claimed is:

1. In a heating system having at least two separate stages of heating, a process for selectively activating the heating stages comprising the steps of:
   monitoring at least one zone to be heated by said heating system for a future change in the set point temperature of the zone;
   activating a first heating stage when the future change in set point temperature is to occur within a predefined period of time; and
   adjusting the position of a damper associated with the zone to be heated so as to maximize the flow of heat to the zone.

2. The process of claim 1 wherein said step of monitoring at least one zone comprises the step of:
   setting a flag denoting that a future change in set point temperature is to occur within a predefined period of time.

3. The process of claim 2 wherein said step of activating a first heating stage when the future change in temperature is within a predefined period of time comprises the steps of:
   comparing the current temperature in the zone with the current set point temperature for the zone;
   checking the value of the flag denoting when a further change in the set point is to occur within a predefined period of time when the difference between current set point and current temperature for the zone is less than a threshold value necessary to switch the first stage of heating on; and activating the first stage of heating if the value of the flag indicates that a future change in set point is to occur within a predefined period of time for the zone.

4. The process of claim 3 wherein said step of adjusting the position of a damper associated with the zone to be heated comprises the steps of:

calculating a damper position based upon the difference between current set point and current temperature in the zone to be heated;

checking the value of the flag denoting when a future change in set point is to occur within a predefined period of time; and overriding the calculated damper position with a predetermined open position when the flag indicates a future change in set point is to occur within a predefined period of time.

5. The process of claim 3 further comprising the step of:

calculating the difference between current set point and the current temperature of the zone to be heated; and activating the second stage of heating only if the calculated difference exceeds a predefined threshold value for activating the second stage of heating.

6. The process of claim 2 further comprising:

comparing a scheduled time indicating when the change in set point temperature is to occur with the current time; and resetting the flag when the current time exceeds the scheduled time.

7. In a system having a plurality of zones to be heated or cooled by a heat pump, a process for activating the heat pump comprising the steps of:

monitoring the zones for future changes in the set point temperature in the zones;

activating a heat pump when the future change in set point temperature for any zone is to occur within a predefined period of time; and adjusting the position of a damper associated with any zones having further changes in set point temperatures occurring within the predefined period of time.

8. The process of claim 7 wherein said step of monitoring the zones for future changes in set point temperatures comprises the step of:

setting a flag for each zone denoting that a future change in set point temperature is to occur for that zone within a predefined period of time.

9. The process of claim 8 wherein said step of activating the heat pump when the future change in temperature is within a predefined period of time comprises the steps of:

comparing the current temperature in each zone with the current set point temperature for the zone;

checking the value of the flag for the zone to determine whether a future change in set point is to occur within a predefined period of time when the difference between current set point and current temperature for the zone is less than a threshold value necessary to switch the first stage of heating on; and activating the heat pump if the value of the flag indicates that a future change in set point is to occur within a predefined period of time for the zone.

10. The process of claim 9 wherein said step of adjusting the position of a damper associated with the zones having changes set point to occur within predefined period of time comprises the steps of:

calculating a damper position based upon the difference between current set point and current temperature for each zone; and checking the value of the flag for each zone denoting whether a future change in set point is to occur within a predefined period of time for the particular zone; and overriding the calculated damper position for each zone with a predetermined open damper position for each zone having a flag that indicates a future change in set point is to occur within a predetermined period of time.

11. The process of claim 8 further comprising the step of:

reading the scheduled times in which the next changes in set point temperature are scheduled to occur in each zone; and resetting the flags of any zones when the current time exceeds the noted scheduled times for these zones.

* * * * *